US012387380B2

(12) United States Patent
Sissoko et al.

(10) Patent No.: US 12,387,380 B2
(45) Date of Patent: Aug. 12, 2025

(54) PRECISION COLOR APPLICATION SYSTEM AND METHOD

(71) Applicant: Accenture Global Solutions Limited, Dublin (IE)

(72) Inventors: Habibou Sissoko, Zurich (CH); Edouard Mathon, Antibes (FR); Victor Chevalier, Nice (FR); Christian Souche, Valbonne (FR)

(73) Assignee: Accenture Global Solutions Limited, Dublin (IE)

( * ) Notice: Subject to any disclaimer, the term of this patent is extended or adjusted under 35 U.S.C. 154(b) by 399 days.

(21) Appl. No.: 18/173,298

(22) Filed: Feb. 23, 2023

(65) Prior Publication Data

US 2023/0298213 A1  Sep. 21, 2023

(30) Foreign Application Priority Data

Mar. 15, 2022  (EP) ..................................... 22305303

(51) Int. Cl.
*G06T 7/90* (2017.01)
*G06T 5/80* (2024.01)
*G06T 7/174* (2017.01)
(52) U.S. Cl.
CPC .................. *G06T 7/90* (2017.01); *G06T 5/80* (2024.01); *G06T 7/174* (2017.01); *G06T 2207/20132* (2013.01); *G06T 2207/30201* (2013.01)

(58) Field of Classification Search
CPC . G06T 7/90; G06T 7/174; G06T 2207/20132; G06T 2207/30201; G06T 11/001; G06T 2200/24; G06T 2207/10024; G06T 2207/20081; G06T 7/0002
See application file for complete search history.

(56) References Cited

U.S. PATENT DOCUMENTS

2015/0050624 A1\* 2/2015 Yamanashi .......... G06V 40/167
434/100

\* cited by examiner

*Primary Examiner* — Matthew C Bella
*Assistant Examiner* — Janice E. Vaz
(74) *Attorney, Agent, or Firm* — Seed Intellectual Property Law Group LLP (57) ABSTRACT

The present disclosure describes a system and method for using image processing to check color application and to indicate to a user where color application is erroneous. The system and method may include capturing a first digital image of an object before color is applied and a second digital image after color is applied. Then, the first and second digital images may undergo editing processes to prepare the digital images for analysis, analysis to determine colors in the digital images, and the generation of heatmaps in a third digital image showing errors in the application of color.

20 Claims, 8 Drawing Sheets

PRECISION COLOR APPLICATION SYSTEM AND METHOD

PRIORITY CLAIM

This application claims priority to European patent application number 22305303.4, entitled "Precision Color Application System and Method", filed on Mar. 15, 2022, which is incorporated by reference in its entirety.

TECHNICAL FIELD

The present disclosure generally relates to applying color to an object. More specifically, the present disclosure relates to systems and methods for using image processing to check color application and to indicate to a user where color application is erroneous.

BACKGROUND

Applying color to an object can require precision when the color is meant to only be present within a predefined boundary. For example, makeup application requires precision to ensure that the makeup is only applied within the boundary of a feature (e.g., eyelid or lips). In the case of applying lipstick, keeping the lipstick within the boundary of the wearer's lips and ensuring that the entirety of the lips is covered with lipstick requires precision. This task can be especially difficult for visually impaired people.

There is a need in the art for a system and method that addresses the shortcomings discussed above.

SUMMARY

In one aspect, the disclosure provides a method for using image processing to check color application. The method may include receiving a first digital image of an object having a first area having a first color and second area having a second color. The method may include receiving a second digital image of the object in which a third color has been applied to one or both of the first area and the second area. The method may include cropping and extracting the first area from the first digital image. The method may include cropping and extracting the first area from the second digital image. The method may include editing the first digital image to eliminate glare and shadows to generate a first edited image. The method may include editing the second digital image to eliminate glare and shadows to generate a second edited image. The method may include using machine learning to extract both the first color and the second color from the first digital image. The method may include using machine learning to extract the third color from the second digital image. The method may include using a threshold measurement to classify pixels to perform color matching on the first area and the second area to determine whether the third color is present in the first area and the second area. The method may include editing the second digital image to generate a third digital image in which a fourth color indicates portions of the first area in which the third color is not present and a fifth color indicates portions of the second area where the third color is present.

In another aspect, the disclosure provides a system for using image processing to check color application. The system includes a processor and machine-readable media including instructions which, when executed by the processor, cause the processor to: (1) receive a first digital image of an object having a first area having a first color and second area having a second color; (2) receive a second digital image of the object in which a third color has been applied to one or both of the first area and the second area; (3) crop and extract the first area from the first digital image; (4) crop and extract the first area from the second digital image; (5) edit the first digital image to eliminate glare and shadows to generate a first edited image; (6) edit the second digital image to eliminate glare and shadows to generate a second edited image; (7) use machine learning to extract both the first color and the second color from the first digital image; (8) use machine learning to extract the third color from the second digital image; (9) use a threshold measurement to classify pixels to perform color matching on the first area and the second area to determine whether the third color is present in the first area and the second area; and (10) edit the second digital image to generate a third digital image in which a fourth color indicates portions of the first area in which the third color is not present and a fifth color indicates portions of the second area where the third color is present.

In another aspect, the disclosure provides a non-transitory computer readable medium storing software that may comprise instructions executable by one or more computers which, upon execution, cause the one or more computers to: (1) receive a first digital image of an object having a first area having a first color and second area having a second color; (2) receive a second digital image of the object in which a third color has been applied to one or both of the first area and the second area; (3) crop and extract the first area from the first digital image; (4) crop and extract the first area from the second digital image; (5) edit the first digital image to eliminate glare and shadows to generate a first edited image; (6) edit the second digital image to eliminate glare and shadows to generate a second edited image; (7) use machine learning to extract both the first color and the second color from the first digital image; (8) use machine learning to extract the third color from the second digital image; (9) use a threshold measurement to classify pixels to perform color matching on the first area and the second area to determine whether the third color is present in the first area and the second area; and (10) edit the second digital image to generate a third digital image in which a fourth color indicates portions of the first area in which the third color is not present and a fifth color indicates portions of the second area where the third color is present.

In some embodiments, the first area is one or both of the top lip and a bottom lip. In some embodiments, the second area is face skin surrounding one or both of the top lip and the bottom lip. In some embodiments, the third color is the color of lipstick. In some embodiments, using machine learning includes using (k-means) clustering of pixels to classify each pixel as belonging to one of a first class including the first color and a second class including the second color. In some embodiments, using machine learning includes using (k-means) clustering of pixels to classify each pixel as belonging to one of a first class including the first color, a second class including the second color, and a third class including the third color. In some embodiments, the third digital image may be presented to a user via a display of a user device or interface.

The method, system, and non-transitory computer readable medium storing software may include any of the features described herein.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
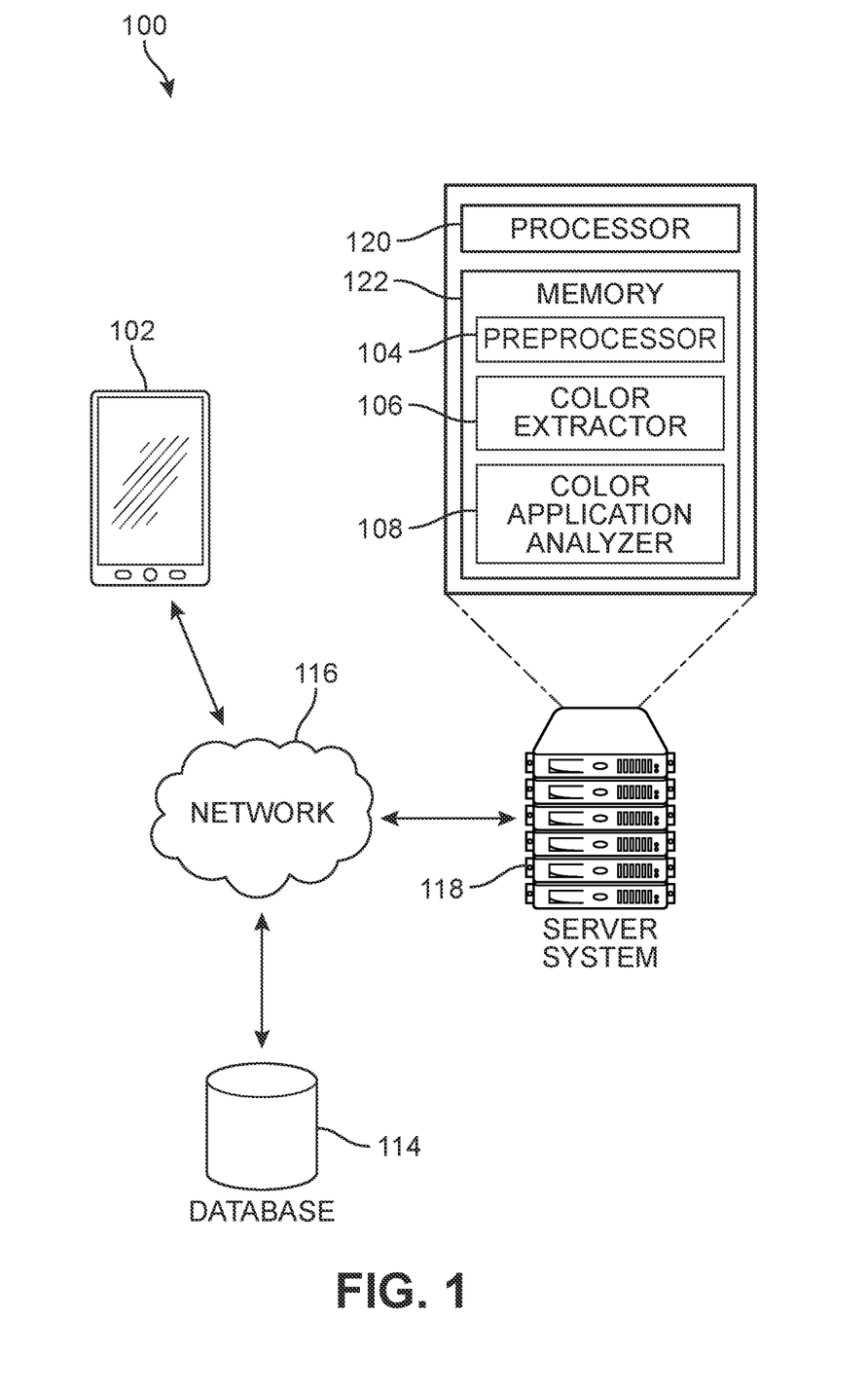
FIG. 1 is a schematic diagram of a system for using image processing to check color application, according to an embodiment.

FIG. 1 is a schematic diagram of a system for using image processing to check color application 100 (or system 100), according to an embodiment. System 100 may include a user and user device 102 (or device 102 or user 102). During use, a user may interact with the system to use image processing to check color application.

The disclosed system may include a plurality of components capable of performing the disclosed method of using image processing to check color application (e.g., method 200). For example, system 100 includes a user device 102, a computing system 118, and a database 114. The components of system 100 can communicate with each other through a network 116. For example, user device 102 may retrieve information from database 114 via network 116. In some embodiments, network 116 may be a wide area network ("WAN"), e.g., the Internet. In other embodiments, network 116 may be a local area network ("LAN").

While FIG. 1 shows one user device, it is understood that one or more user devices may be used. For example, in some embodiments, the system may include two or three user devices. The user(s) may include an individual applying color (e.g., makeup) to an object (e.g., a person's face). In some embodiments, the user devices may be computing devices used by a user. For example, user device 102 may include a smartphone or a tablet computer. In other examples, user device 102 may include a laptop computer, a desktop computer, and/or another type of computing device. The user devices may be used for inputting, processing, and displaying information. In some embodiments, a digital camera may be used to generate images used for analysis in the disclosed method. In some embodiments, the user device may include a digital camera that is separate from the computing device. In other embodiments, the user device may include a digital camera that is integral with the computing device, such as a camera on a smartphone or tablet.

As shown in FIG. 1, in some embodiments, a preprocessor 104, a color extractor 106, and a color application analyzer 108 may be hosted in a computing system 118. Computing system 118 includes a processor 120 and a memory 122. Processor 120 may include a single device processor located on a single device, or it may include multiple device processors located on one or more physical devices. Memory 122 may include any type of storage, which may be physically located on one physical device, or on multiple physical devices. In some cases, computing system 118 may comprise one or more servers that are used to host the system.

As discussed in more detail below, the preprocessor may edit the images analyzed using the disclosed method. The color extractor may extract colors from the edited images. The color application analyzer may analyze the edited images to determine where a color has been applied with respect to a predefined area in the edited image.

In some embodiments, users may utilize user device (e.g., computer or smartphone, etc.) to interact with the system to use image processing to check color application. For example, a user may input digital images and initiate analysis of the images by using a user device (e.g., a smartphone). In some embodiments, the user may interact with the system by communicating with a digital assistant (or chatbot), responding to prompts, and/or selecting from a list of options. For example, in some embodiments, a virtual assistant or a webpage may prompt a user to upload digital images. In some embodiments, the user may provide voice input. In such embodiments, the system may include a voice-to-text processor that performs natural language processing (NLP) on the voice input to convert the user's spoken words to text that can be used as input by the system.

The disclosed methods determine whether a feature having a particular boundary or area is precisely colored within the boundary or area (i.e., color is uniformly applied within boundary/area and does not breach the boundary/area to regions beyond the boundary). In some embodiments, the method may include photographing an object without color applied to render a first digital image and then photographing the object with color applied to render a second digital image for comparison with the first digital image. For example, photographing an object such as a person's lips without lipstick can generate a first digital image and photographing the same person's lips with lipstick applied can generate a second digital image. The first digital image and second digital image may be edited to eliminate glare and shadows by the preprocessor. Then, the first digital image and second digital image may be analyzed by the application analyzer to determine which colors appear in areas of interest and in surrounding areas.

It is common in image processing to use a red-green-blue ("RGB") colorspace. RGB colorspaces are not perceptually uniform. In other words, in an RGB colorspace, two drastically different colors may have representations that are close with respect to the spatial Euclidian distance. Thus, spatial Euclidian distance cannot be used to find similar colors in RGB colorspaces. Additionally, when trying to detect colors in an image with shadows and light occurring in different areas of a face, the shadows and light can make it difficult to recognize that a facial feature (e.g., lip) is all the same color because the shadows and light can confuse the RGB colorspace into detecting the shadow and light on the facial feature as different colors. In other words, using the RGB colorspace, the shaded side of the feature will be detected as one color and the lit side of the face will be detected as a different color.

Rather than using an RGB colorspace, the disclosed method may include converting the first and second digital images to CIELAB colorspace, which is perceptually uniform and allows the use of clustering (e.g., k-means clustering) to find the exact color value that truly represents the area. This is because similar colors have representations that are close together with respect to Euclidian distance in the CIELAB colorspace. Following the example mentioned above with a face lit on one side and shaded on the other side, using the CIELAB colorspace to detect colors can capture that a feature that is lit on one side and shaded on the other side is the same color. The CIELAB colorspace can recognize that an object is all one color even when it is appearing differently in an image depending on where the light is or is not illuminating the object. Similarly, the CIELAB colorspace can recognize that a color (e.g., of lipstick) applied in different levels of thickness, which may slightly change the shade of the color if various portions of a photo, is the same color in the respective various portions.

Once the colors in an image are extracted, a range of colors sufficiently close to the extracted color may be used to catch the maximum surface of the area of interest (e.g., lip) without including noisy colors, such as facial hair or face skin color. To find the range of colors, a threshold that accepts colors around a certain distance from the initial color may be found and applied. The accepted colors may be within a radius of colors and may be restricted to a different shade of the extracted color.

Figure 2A:
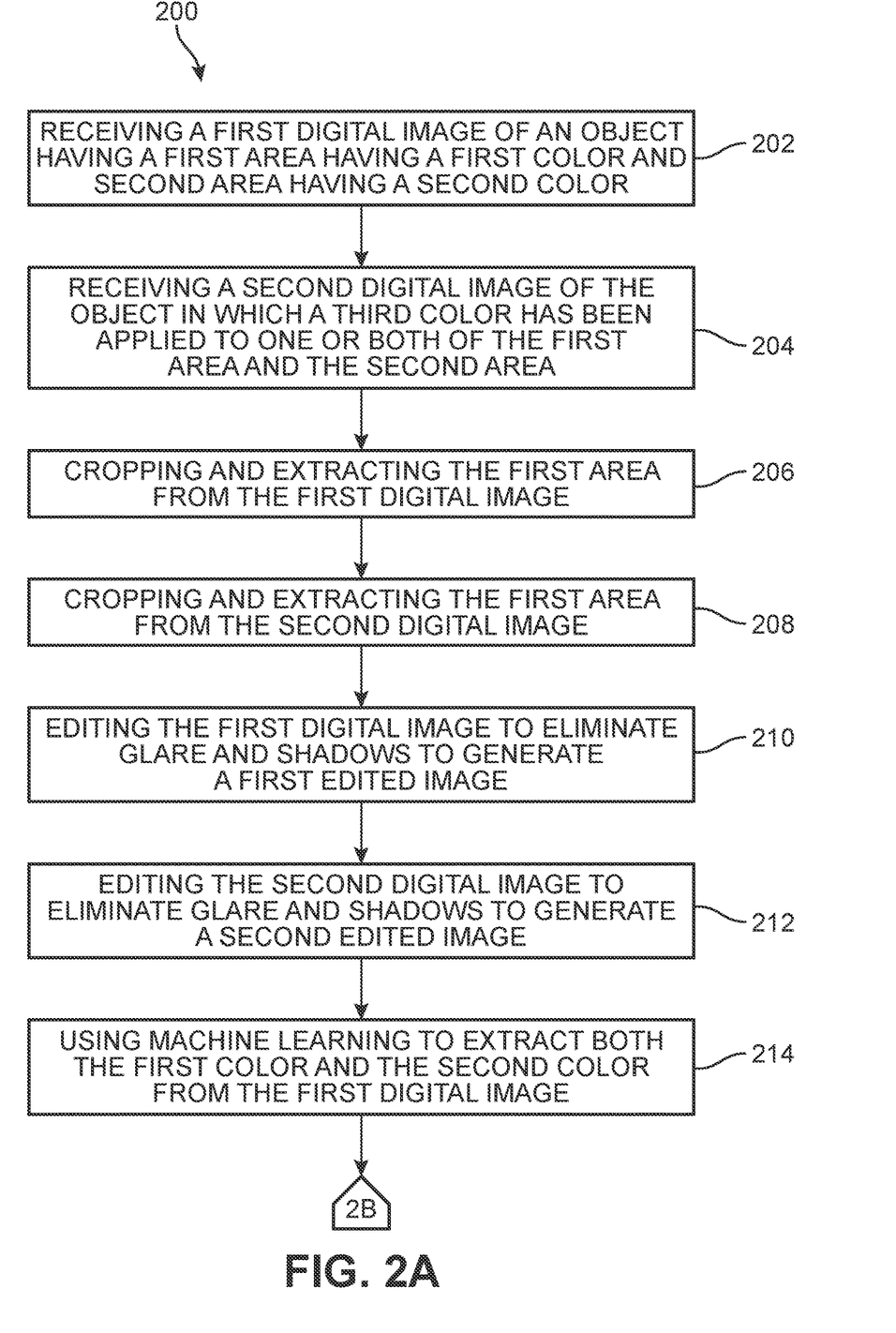
FIGS. 2A and 2B show a method for using image processing to check color application, according to an embodiment.
Figure 2B:
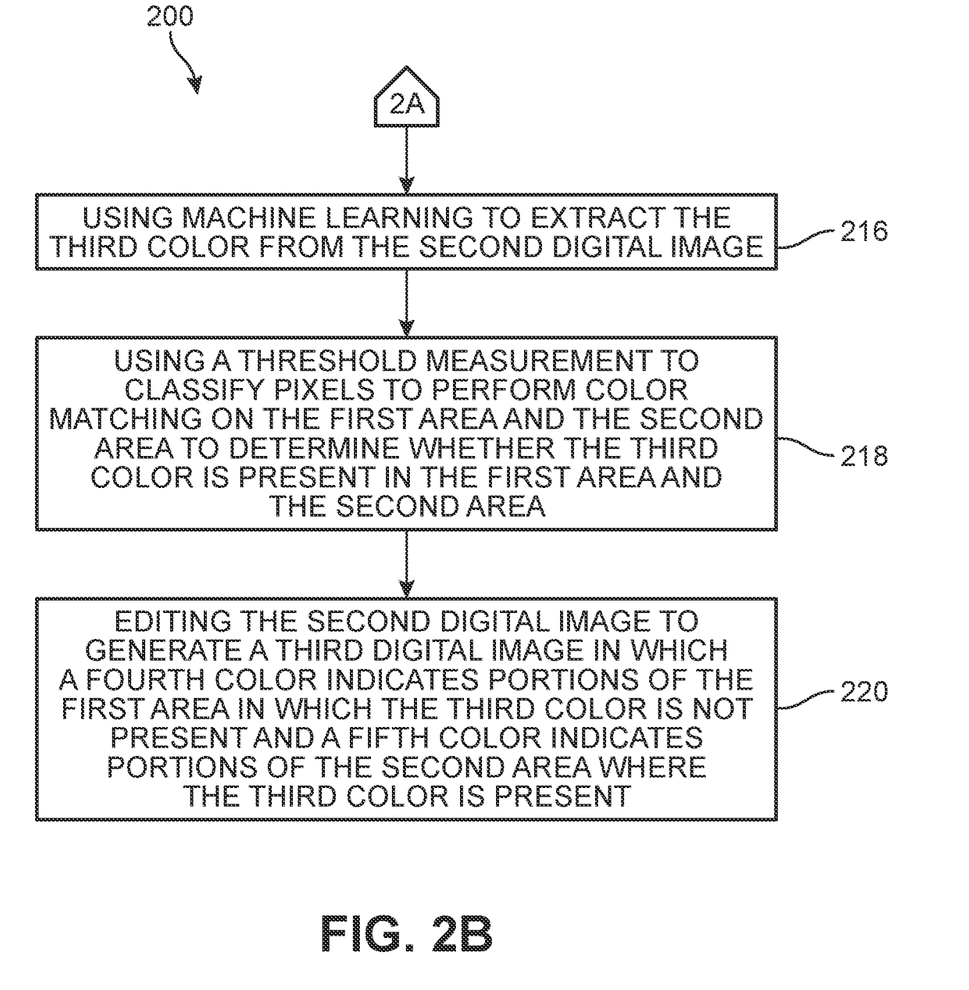
Figure 6:
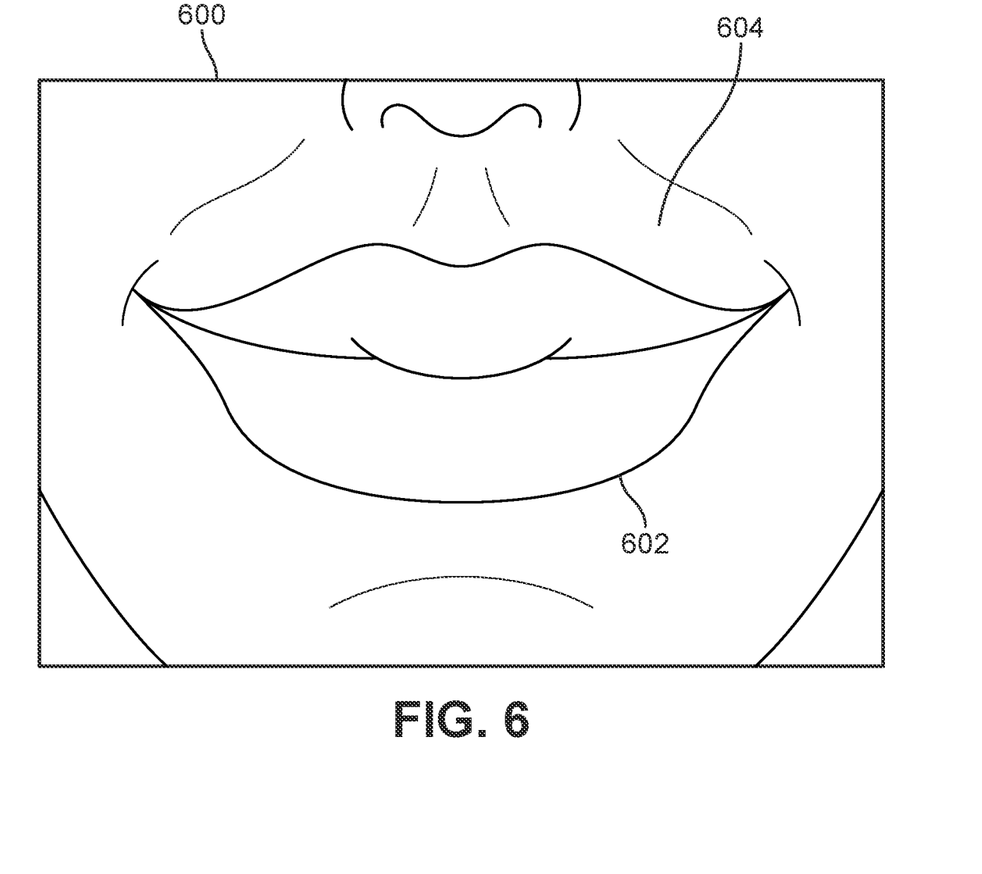
FIG. 6 shows an image of lips before lipstick is applied, according to an embodiment.

FIGS. 2A and 2B show a method for using image processing to check color application, according to an embodiment. In some embodiments, the method may include receiving a first digital image of an object having a first area having a first color and second area having a second color (operation 202). For example, the first area may be one or both of a top lip and a bottom lip and the second area may be the face skin surrounding one or both of the top lip and the bottom lip. FIG. 6, discussed in more detail below, shows an image 600 showing set of lips 602 and surrounding skin 604. In another example, the first area may be an eyelid and the second area may be the face skin surrounding the eyelid. In yet another example, the first area may be an outline of a tattoo.

Figure 7:
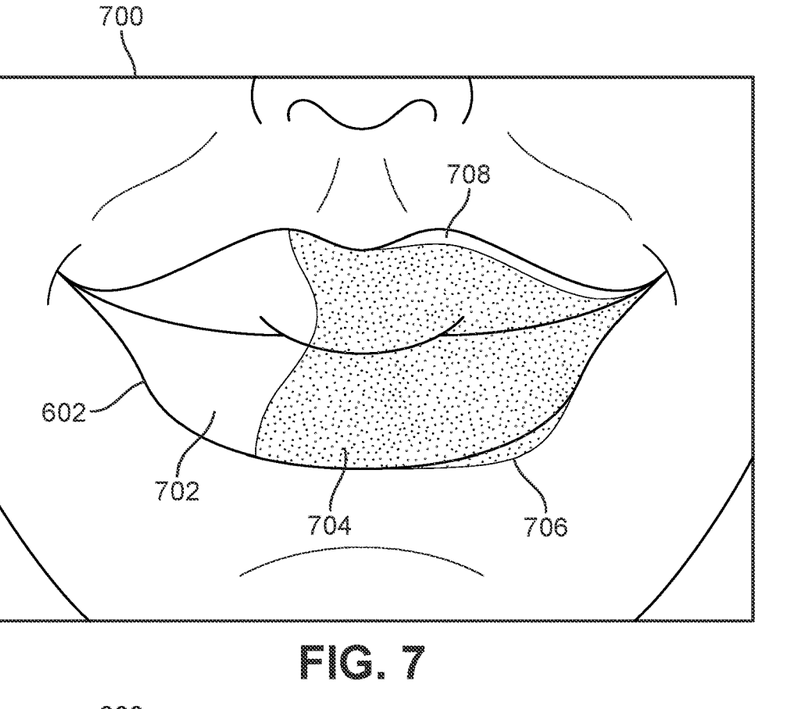
FIG. 7 shows the lips from FIG. 6 once lipstick is applied, according to an embodiment.
Figure 9:
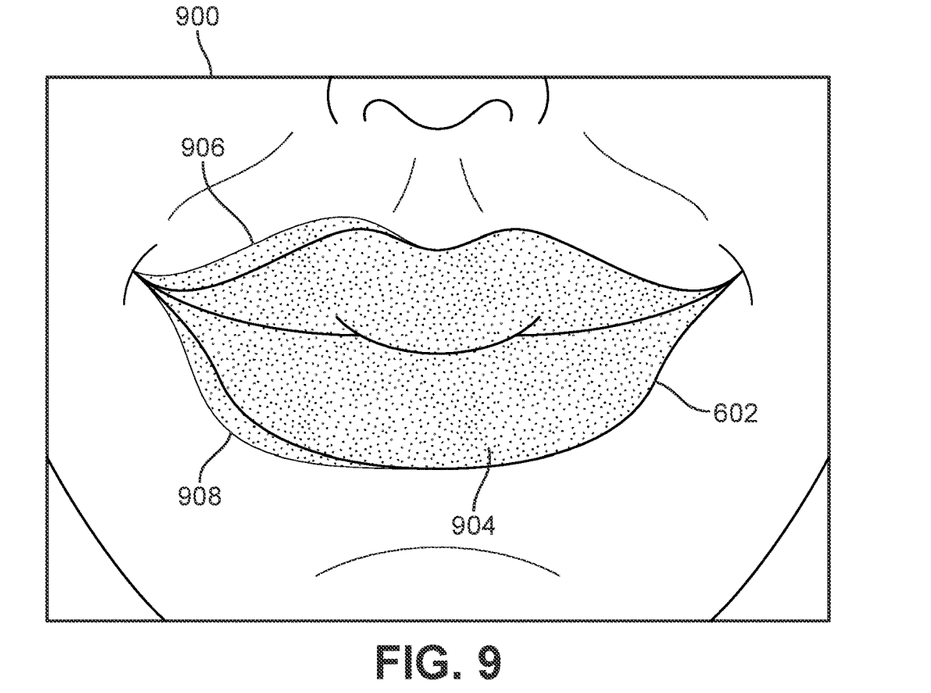
FIG. 9 shows the lips from FIG. 6 once lipstick is applied, according to an embodiment.

In some embodiments, the method may include receiving a second digital image of the object in which a third color has been applied to one or both of the first area and the second area (operation 204). For example, the third color may be a color of a lipstick or a color of eyeshadow. In another example, the third color may be a tattoo fill color. FIG. 7, shows an image 700 showing set of lips 602 (first area having first color) with lipstick 704 (third color) applied to a portion of the set of lips 602. FIG. 9 shows another example of set of lips 602 (first area having first color) with lipstick 904 (third color) applied.

In some embodiments, the method may include cropping and extracting the first area from the first digital image (operation 206). For example, the first area may include a facial feature, such as lips or eyelid, and optionally surrounding areas of the facial feature. FIG. 6 shows an example of how an image of a face may be cropped to just a set of lips 602 (facial feature) and surrounding skin 604 (surrounding area of lips). In some embodiments, cropping and extracting may include extracting accurate facial key points. In some embodiments, the method may include cropping and extracting the first area from the second digital image (operation 208). The cropping and extracting of the first and second digital images may be performed automatically in response to previous operations, according to various embodiments.

In some embodiments, the method may include editing the first digital image to eliminate glare and shadows to generate a first edited image (operation 210). Reducing glare may be achieved by converting the first digital image to grayscale and classifying pixels in the first image as having light value above a predefined threshold and applying blur to such pixels. By reducing glare, the colors in the areas of interest in the first digital image may be truer to the real life areas of the object appearing in the first digital image. In some embodiments, the method may include editing the second digital image to eliminate glare and shadows to generate a second edited image (operation 212). This operation by be performed in the same way that the first digital image is edited to eliminate glare and shadows to generate a first edited image. Reducing glare and shadows may be performed automatically before or after cropping in response to previous operations, according to various embodiments.

Figure 3:
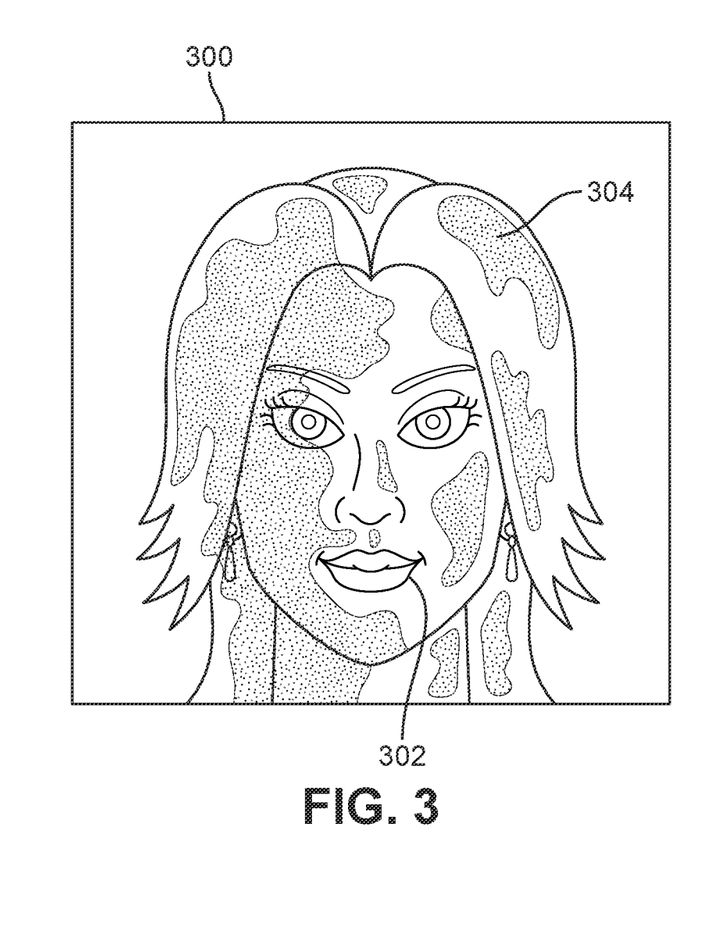
FIG. 3 shows an image with shadows, according to an embodiment.
Figure 4:
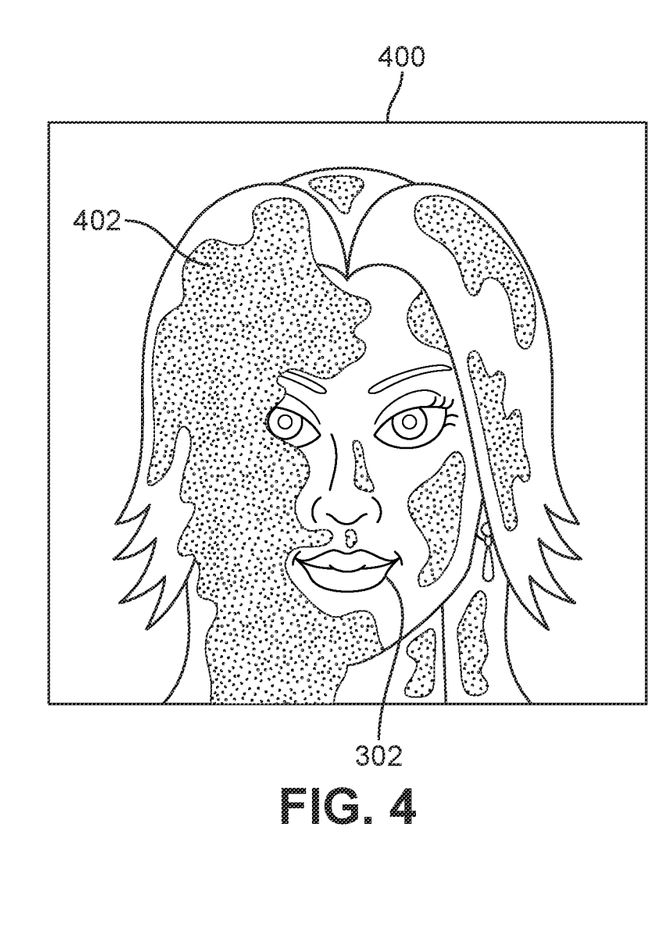
FIG. 4 shows the image of FIG. 3 after editing to remove shadows, according to an embodiment.

FIGS. 3 and 4 demonstrate before and after shadow removal of a digital image. FIG. 3 shows "before" digital image 300. "Before" digital image 300 includes shadows 304, according to an embodiment. In FIG. 3, the stippling represents shadows. FIG. 4 shows "after" digital image 400, which is a version of digital image 300 after editing to remove shadows 304, according to an embodiment. The removed shadows are shown as darker stippled areas 402 of the image 400. It is understood that in an edited photo, the portions of the image where the shadows have been removed may appear as completely black or in any other form that helps the system focus on analyzing colors in other portions of the image where shadows are not present. As mentioned above, this shadow removal process may be applied to the first digital image. This shadow removal process may also be applied to the second digital image. The shadow removal process may be performed automatically in response to previous operations, according to various embodiments.

Shadows can cause noise when extracting color for the color analysis process because shadows alter colors as they appear in light. Accordingly, color extraction is improved when shadow extraction is performed as preprocessing. In some embodiments, editing the first digital image to eliminate shadows may include changing the colorspace in the first digital image to the YCrCb colorspace, a colorspace specifically meant to define light intensity, to access perceived luminance channel of the first digital image (Y). The perceived luminance channel is a channel providing values for light. In some embodiments, editing the first digital image to eliminate shadows may further include determining which values in the YCrCb colorspace version of the first digital image correspond to shadows or not shadows. Because different scenarios have different shadow intensities, the method may include automatically detecting the intensity of the shadow to remove. The value that corresponds to shadows in a particular image can be used as a threshold to determine which pixels are to be removed from the first digital image. In this way, the range of light corresponding to a particular image can be used to tailor the threshold for shadows in the same image. For example, after changing to the YCrCb colorspace, the threshold for shadow intensity in the first digital image can be found by using the following equation:

$$\text{Threshold} = \left(\frac{1}{n}\sum_{k=1}^{n} x_k\right) - \frac{\sqrt{\frac{1}{n}\sum_{k=1}^{n} x_k - \left(\frac{1}{n}\sum_{k=1}^{n} x_k\right)}}{3},$$

where x represents the pixel intensity, n represents the total number of pixels, and k represents the pixel number in the Y channel.
>Threshold may be represented by 0 and x<Threshold may be represented by 1. Shadows in areas surrounding the worksurface/feature of interest may not be removed because the threshold accounts for the description of pixels in the lit area and the dark area. In other words, the threshold corresponds to the values for light found in the specific image. This means that the calculated threshold is specific to the range of light values found in the image. The technique for removing shadows described above can handle different light intensities of shadows.

Figure 5:
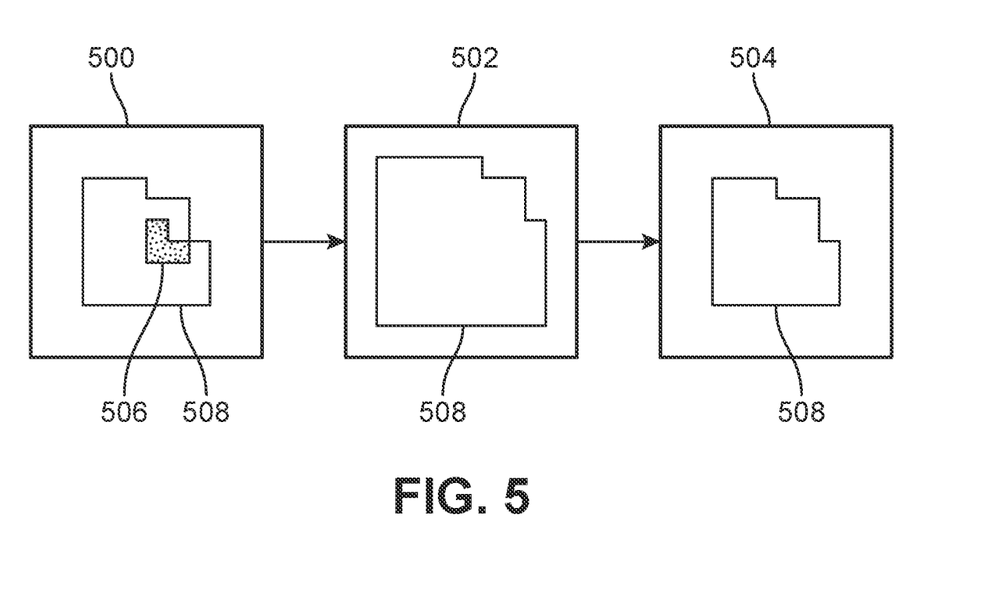
FIG. 5 shows an image before modification, after dilation, and after dilation and erosion, according to an embodiment.

In some cases, the class (e.g., whether or not a shadow) cannot be determined for outliers due to their mitigate neighbors. In these cases, these outliers may be classified using morphological transformations. For example, in some embodiments, the method may include performing dilation to expand the first area to absorb noise. FIG. 5 shows an exemplary embodiment of dilation. Image 500 shows an object 508 prior to dilation. FIG. 5 shows a very simplistic object to help convey the general idea of dilation. In image 500, object 508 includes noise 506 that is caused by the exposure of the photo. In other words, noise 506 appears only in image 500 and not in real life, as noise 506 is not part of the actual object 508. During dilation, pixels are expanded to fill in noise 506 such that noise 506 is no longer part of the image. Image 502 shows object 508 after dilation has occurred. Dilation may be defined as $$\delta_B(X) = \{x | \check{B}_x \cap X \neq \emptyset\},$$

where x represents a pixel in the image, B represents a structuring element with dimension lesser than the image dimension, $\check{B}_x$ denotes the rational symmetric of B where each element is the opposite value of the element in B, X represents a binary image generated from the original image, and δ an arbitrary decimal value representing the distance between two colors (here, the distance is between the selected colors and the skin color).

In some embodiments, the method may include performing erosion to regain to the original shape of the first area by shrinking the first area. Since dilation can distort the original image a bit, erosion can help enhance the result of dilation. Image 504 shows object 508 after dilation and erosion have both occurred. In image 504, noise 506 has been completely eliminated and the appearance of the general shape of the object is closer to its true shape. Erosion may be defined as $$\in_B(X) = X \ominus B = \{x | B_x \subset X\},$$

where x represents a pixel in the image, B represents a structuring element with a dimension lesser than the image dimension, X represents a binary image generated from the original image.

In some embodiments, the method may include using machine learning to extract both the first color and the second color from the first digital image (operation 214). This operation may be performed automatically in response to previous operations, according to various embodiments.

In some embodiments, using machine learning may include using (k-means) clustering of pixels to classify each pixel as belonging to one of a first class including the first color and a second class including the second color. For example, in some embodiments, the following equation may be used to find the appropriate colors (e.g., the maximum color on an area, such as a lip) in the first digital image:

$$\arg\min_S \sum_{i=1}^{K} \sum_{x_j \in S_i}^{j} \|x_j - \mu_i\|^2$$

As part of extracting the first color and the second color, the following equation may be used to find the distance between skin color(S) and selected color (c):

$$\text{skin}_{distance} = \sqrt{(c_1 - s_1)^2 + (c_2 - s_2)^2 + (c_3 - s_3)^2},$$

where $\text{skin}_{distance} < \lambda$ means that the selected color is too similar to the skin color to perform a check and $\text{skin}_{distance} > \lambda$ means that the selected color is different enough from the skin color to perform a check.
The threshold for skin distance may be found with the following equations:

$$\text{threshold} = f(\text{skin\_distance})$$

$$f(\text{skin\_distance}) = \begin{cases} \sqrt{\text{skin}_{distance}} * \gamma, & \text{skin}_{distance} > \lambda \\ \emptyset, & x \leq \lambda \end{cases},$$

where λ represents an arbitrary decimal value representing the distance threshold between the skin and the selected color. The distance must be greater than λ to perform the check. The classification errors may be defined as:

$$f(x) \begin{cases} \sqrt{(x_1 - b_1)^2 + (x_2 - b_2)^2 + (x_3 - b_3)^2} < \delta \\ \sqrt{(x_1 - w_1)^2 + (x_2 - w)^2 + (x_3 - w_3)^2} < \delta \\ \sqrt{(x_1 - s_1)^2 + (x_2 - s_2)^2 + (x_3 - s_3)^2} < \text{threshold} \end{cases},$$

wherein w represents white color, b represents black color, x represents pixel color, and δ represents an arbitrary decimal value representing the distance between two colors (here, the distances with the black, white and selected colors). The colors RGB (red, green, blue, respectively) have corresponding values of 1, 2, and 3.

False: pixel classified as legitimate.
True: pixel classified as error.

The verification of the distance between the extracted color value, the black value, and the white value increases the precision of the color check, which solves the problem of detecting the right color for different skin tones.

In some embodiments, the method may include using machine learning to extract the third color from the second digital image (operation 216). For example, using machine learning may include using (k-means) clustering of pixels to classify each pixel as belonging to one of a first class including the first color, a second class including the second color, and a third class including the third color. The same techniques for classification discussed above may be used for extracting the third color from the second digital image.

In some embodiments, the method may include using a threshold measurement to classify pixels to perform color matching on the first area and the second area to determine whether the third color is present in the first area and the second area (operation 218). The method may further include presenting, via a display of a user interface or device, the third digital image to a user.

In some embodiments, the method may include generating and displaying output that communicates whether color has been applied only within the first area. For example, a heatmap may be generated and displayed to a user via a display of a user interface or device. In such a heat map, cold to hot colors may be displayed in areas such that the hottest color represents areas with many mistakes. For example, in some embodiments, the method may include editing the second digital image to generate a third digital image in which a fourth color indicates portions of the first area in which the third color is not present and a fifth color indicates portions of the second area where the third color is present (operation 220).

Figure 8:
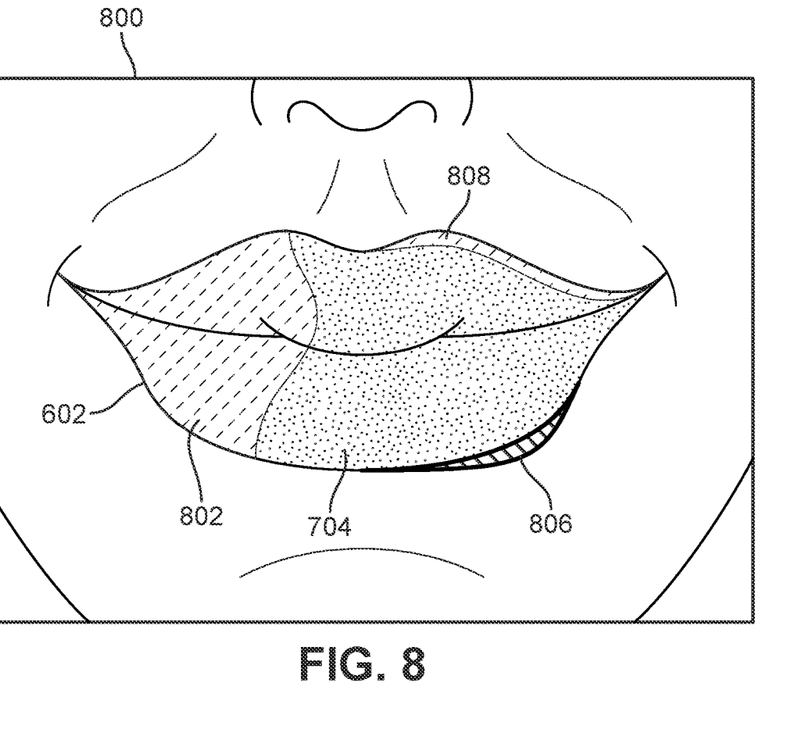
FIG. 8 shows the image from FIG. 7 with a heatmap indicating where lipstick is and is not applied, according to an embodiment.

To demonstrate the generation and display of a heatmap, FIG. 6 shows an image 600 of lips 602 before lipstick is applied and FIG. 7 shows an image 700 of lips 602 once lipstick is applied, according to an embodiment. In FIG. 7, lipstick is messily applied, as it is only applied to a portion of set of lips 602 at 704 (shown with stippling to accommodate the black and white nature of drawings), while set of lips 602 is still bare without lipstick applied at 702 and 708, and a bit of lipstick goes outside the boundary of set of lips 602 at 706. FIG. 8 shows a heatmap in which a pattern of broken lines at 802 and 808 (which could be a color, e.g., yellow) indicates that lips are bare at these identified areas and a pattern of solid lines at 806 (which could be a color, e.g. blue) indicates that an area of surrounding skin 604 is covered by lipstick. In other words, the heatmap shows the mistakes made with the application of color (e.g., lipstick) by indicating with a pattern or color where lipstick is either lacking on the lips or appears where it should not (e.g., outside the boundary/perimeter of lips).

Figure 10:
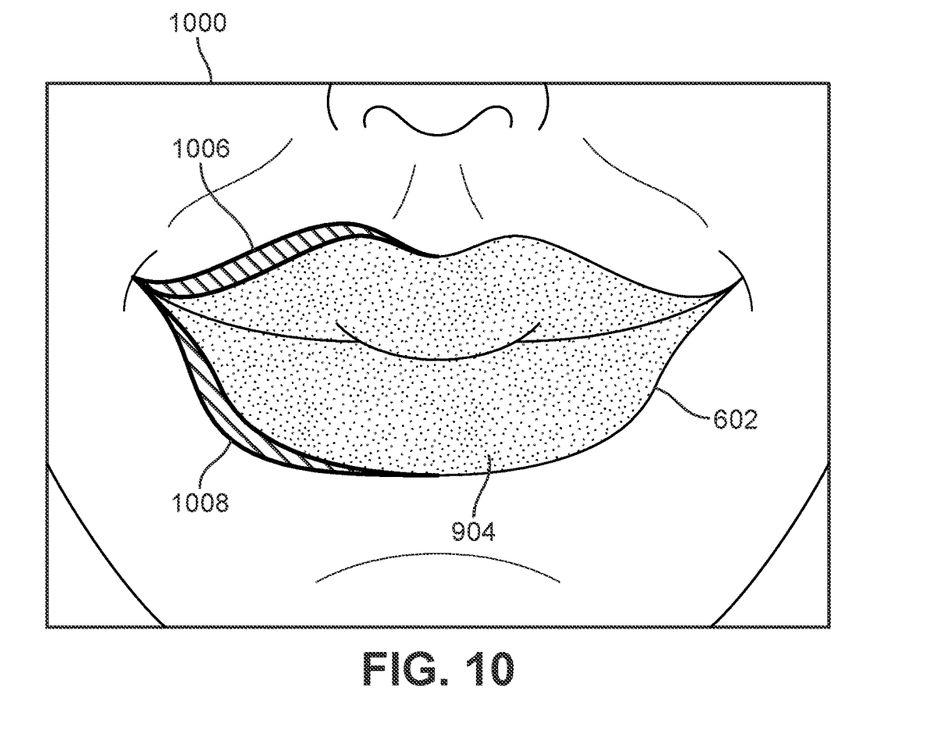
FIG. 10 shows the image from FIG. 9 with a heatmap indicating where lipstick is and is not applied, according to an embodiment.

FIG. 9 shows another example of set of lips 602 with lipstick messily applied. In FIG. 9, lipstick covers all of set of lips 602 at 904 (shown with stippling to accommodate the black and white nature of drawings), but also has been applied to surrounding skin 604 at 906 and 908. In the heatmap shown in FIG. 10, solid lines at 1006 and 1008 indicate the area where lipstick appears out of place.

In another example of generating and displaying output that communicates whether color has been applied only within the first area, JSON/CSV/HTML coordinates may be generated and displayed. In such embodiments, the coordinates for JSON and CSV, respectively, may include the following:

JSON: {"mistakes": {{"x": 12, "y": 23}}}
CSV: "true, 12, 23" with header equals to "mistake", "x" and "y".

In yet another example of generating and displaying output that communicates whether color has been applied only within the first area, a 3D map may be generated from the 2D input with coordinates. In such an embodiment, 3D depth estimations can be performed to add the third dimension.

In some embodiments, instead of or in addition to generating and displaying output that communicates whether color has been applied only within the first area, the method may include using a robot to apply and/or remove makeup. In such an embodiment, the robot may use the 3D map output with the ability to detect the first area (e.g., lips) to locate areas that needs color (e.g., lipstick) application or removal.

In some embodiments, the disclosed method can help a visually impaired person check color application (e.g., validate if they have applied color within the first area without bleeding into the second area). For example, the output may be voice telling the user where the color is either missing in the first area or erroneously applied in the second area.

In some embodiments, the disclosed method may be used as part of a system completing missing color application (e.g., makeup) with custom colors.

In some embodiments, a system that can detect lips could use JSON output to add virtual colors (e.g., lipstick) on the part of the first area (e.g., lips) needing color (e.g., lipstick) since the system will know the pixels already containing lipstick.

In some embodiments, the disclosed method may include tracking the use of a product (e.g., lipstick) and predicting when the product will run out and should be replaced. For example, the use of lipstick may be tracked by knowing the dimensions of how much lipstick appears in the second digital image. In such embodiments, a heatmap could help determine the quantity of lipstick applied based on the size of the area and information on the product itself.

It should be understood that the systems and/or methods as described herein may be implemented using different computing systems, components, modules, and connections. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

We claim:

1. A method of using image processing to check color application, comprising:
   receiving a first digital image of an object having a first area having a first color and second area having a second color;
   receiving a second digital image of the object in which a third color has been applied to one or both of the first area and the second area;
   cropping and extracting the first area from the first digital image;
   cropping and extracting the first area from the second digital image;
   editing the first digital image to eliminate glare and shadows to generate a first edited image;
   editing the second digital image to eliminate glare and shadows to generate a second edited image;
   using machine learning to extract both the first color and the second color from the first digital image;
   using machine learning to extract the third color from the second digital image;
   using a threshold measurement to classify pixels to perform color matching on the first area and the second area to determine whether the third color is present in the first area and the second area; and
   editing the second digital image to generate a third digital image in which a fourth color indicates portions of the first area in which the third color is not present and a fifth color indicates portions of the second area where the third color is present.

2. The method of claim 1, wherein the first area is one or both of a top lip and a bottom lip.

3. The method of claim 2, wherein the second area is face skin surrounding one or both of the top lip and the bottom lip.

4. The method of claim 1, wherein the third color is the color of lipstick.

5. The method of claim 1, wherein using machine learning includes using (k-means) clustering of pixels to classify each pixel as belonging to one of a first class including the first color and a second class including the second color.

6. The method of claim 1, wherein using machine learning includes using (k-means) clustering of pixels to classify each pixel as belonging to one of a first class including the first color, a second class including the second color, and a third class including the third color.

7. The method of claim 1, further including presenting, via a display of a user interface, the third digital image to a user.

8. A system for using image processing to check color application, the system comprising:
   a processor;
   machine-readable media including instructions which, when executed by the processor, cause the processor to:
      receive a first digital image of an object having a first area having a first color and second area having a second color;
      receive a second digital image of the object in which a third color has been applied to one or both of the first area and the second area;
      crop and extracting the first area from the first digital image;
      crop and extracting the first area from the second digital image;
      edit the first digital image to eliminate glare and shadows to generate a first edited image;
      edit the second digital image to eliminate glare and shadows to generate a second edited image;
      use machine learning to extract both the first color and the second color from the first digital image;
      use machine learning to extract the third color from the second digital image;
      use a threshold measurement to classify pixels to perform color matching on the first area and the second area to determine whether the third color is present in the first area and the second area; and
      edit the second digital image to generate a third digital image in which a fourth color indicates portions of the first area in which the third color is not present and a fifth color indicates portions of the second area where the third color is present.

9. The system of claim 8, wherein the first area is one or both of a top lip and a bottom lip.

10. The system of claim 9, wherein the second area is face skin surrounding one or both of the top lip and the bottom lip.

11. The system of claim 8, wherein the third color is the color of lipstick.

12. The system of claim 8, wherein using machine learning includes using (k-means) clustering of pixels to classify each pixel as belonging to one of a first class including the first color and a second class including the second color.

13. The system of claim 8, wherein using machine learning includes using (k-means) clustering of pixels to classify each pixel as belonging to one of a first class including the first color, a second class including the second color, and a third class including the third color.

14. A non-transitory computer-readable medium storing software comprising instructions executable by one or more computers which, upon such execution, cause the one or more computers to:
   receive a first digital image of an object having a first area having a first color and second area having a second color;
   receive a second digital image of the object in which a third color has been applied to one or both of the first area and the second area;
   crop and extracting the first area from the first digital image;
   crop and extracting the first area from the second digital image;

edit the first digital image to eliminate glare and shadows to generate a first edited image;

edit the second digital image to eliminate glare and shadows to generate a second edited image;

use machine learning to extract both the first color and the second color from the first digital image;

use machine learning to extract the third color from the second digital image;

use a threshold measurement to classify pixels to perform color matching on the first area and the second area to determine whether the third color is present in the first area and the second area; and edit the second digital image to generate a third digital image in which a fourth color indicates portions of the first area in which the third color is not present and a fifth color indicates portions of the second area where the third color is present.

15. The non-transitory computer-readable medium storing software of claim 14, wherein the first area is one or both of a top lip and a bottom lip.

16. The non-transitory computer-readable medium storing software of claim 15, wherein the second area is face skin surrounding one or both of the top lip and the bottom lip.

17. The non-transitory computer-readable medium storing software of claim 14, wherein the third color is the color of lipstick.

18. The non-transitory computer-readable medium storing software of claim 14, wherein using machine learning includes using (k-means) clustering of pixels to classify each pixel as belonging to one of a first class including the first color and a second class including the second color.

19. The non-transitory computer-readable medium storing software of claim 14, wherein using machine learning includes using (k-means) clustering of pixels to classify each pixel as belonging to one of a first class including the first color, a second class including the second color, and a third class including the third color.

20. The non-transitory computer-readable medium storing software of claim 14, wherein the instructions further cause the one or more computers to: present, via a display of a user interface, the third digital image to a user.

* * * * *